United States Patent [19]
Leibert

[11] 3,779,455
[45] Dec. 18, 1973

[54] LIFTOFF AND LANDING DISTANCE INDICATOR

[76] Inventor: Edward E. Leibert, 2330 Hood Pl., Walla Walla, Wash. 99362

[22] Filed: Feb. 9, 1973

[21] Appl. No.: 331,254

[52] U.S. Cl.............. 235/95, 235/103, 235/150.22, 235/92
[51] Int. Cl............................................ G01c, G06f
[58] Field of Search.................. 235/95 R, 95 B, 96, 235/97, 103, 151.32, 151.22, 92 DN, 92 AE, 235/103.5 R; 73/490, 509, 511, 514

[56] References Cited
UNITED STATES PATENTS

| | | | |
|---|---|---|---|
| 3,205,707 | 9/1965 | Richter | 235/150.22 |
| 3,202,353 | 8/1965 | Nowak et al | 235/96 |
| 3,166,245 | 1/1965 | Maschke | 235/103 |
| 2,447,588 | 8/1948 | McNairn | 235/103 |

Primary Examiner—Richard B. Wilkinson
Assistant Examiner—Pat Salce

Attorney—Hyman Berman et al.

[57] ABSTRACT

A liftoff and landing distance indicator consisting of a pulsing circuit driven by an aircraft wheel and including a switch mechanically operated by a flywheel having a lost-motion connection with the aircraft wheel. The switch is closed shortly after the aircraft wheel starts to roll and is opened as the flywheel backs off slightly as the aircraft wheel leaves the ground. Another switch is provided to close the pulsing circuit when landing. The pulsing circuit includes a counter whereby the sum of the pulses are recorded. In an alternative embodiment the aircraft wheel drives an alternating current generator connected through a divider and through normally closed contacts of a relay to the counter. The relay has an energizing circuit including an electronic switch which is controlled by an integrating circuit and a discharge circuit connected to the generator and arranged to energize the relay and open the counter circuit when the aircraft wheel leaves the ground.

10 Claims, 5 Drawing Figures

LIFTOFF AND LANDING DISTANCE INDICATOR

This invention relates to distance indicators and more particularly to a monitoring device for use on an aircraft to provide the pilot of the aircraft with a measurement of the distance traveled along the runway to attain liftoff or the distance over which the aircraft wheels roll in landing, and to store this information until the device is reset by the pilot.

A main object of the invention is to provide a novel and improved liftoff and landing distance indicator for aircraft, the indicator being relatively simple in construction, being easy to install, and providing accurate indication of the distance traveled by the aircraft down the runway to attain liftoff or the lengths of landing roll of the aircraft wheels, thereby providing information which is very useful in the training of pilots in that it affords valuable information as to the effects of wind, temperature and pilot skill in short field takeoff and landing techniques.

A further object of the invention is to provide an improved liftoff and landing distance indicator for aircraft, the indicator involving relatively inexpensive components, being durable in construction, having a high degree of accuracy, being reliable in operation, and providing the pilot of the associated aircraft with valuable information in connection with the aircraft takeoff and landing capability.

A still further object of the invention is to provide an improved instrument for indicating the liftoff and landing distances required by an aircraft, thereby providing an important measure of the takeoff and landing performance of the aircraft and enabling the pilot to effect fast takeoffs or landings under various operating and runway conditions such as those encountered in military or commercial service, as well as in many other applications.

Further objects and advantages of the invention will become apparent from the following description and claims, and from the accompanying drawings, wherein:

Figure 1:
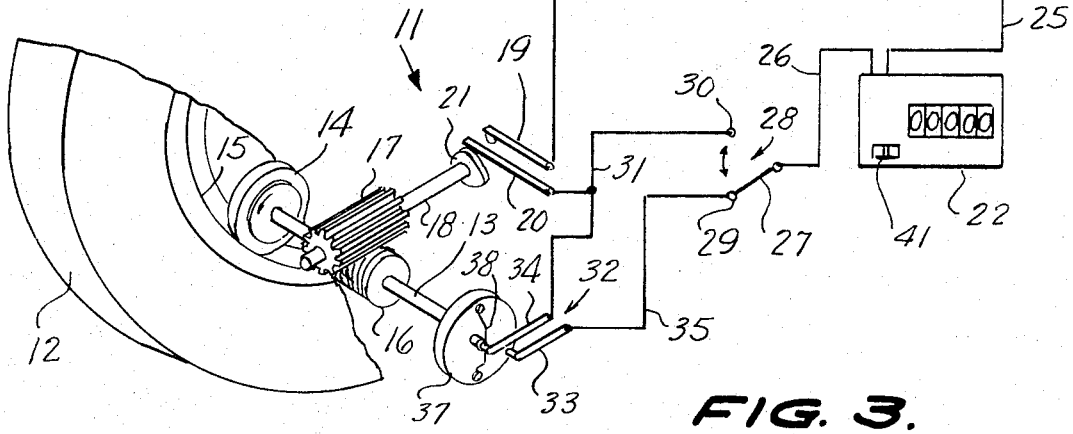
FIG. 1 is a fragmentary perspective view and wiring diagram illustrating one form of liftoff and landing distance indicator for an aircraft in accordance with the present invention.
Figure 2:
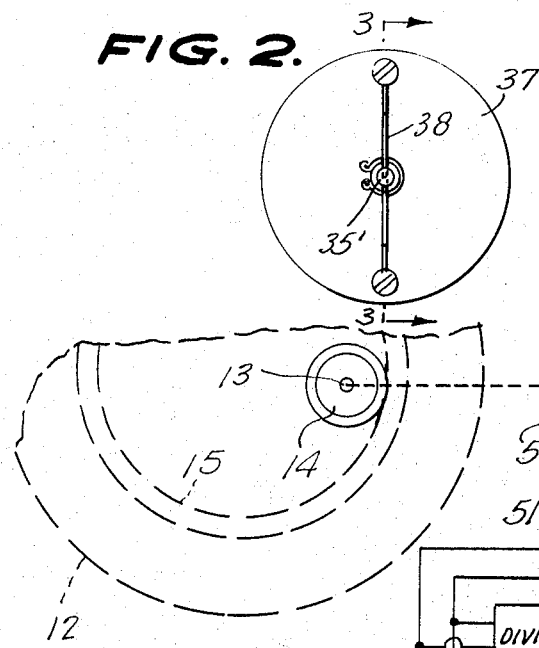
FIG. 2 is an enlarged end elevational view of the flywheel member and the switch-operating screw employed in the device shown in FIG. 1.

Referring to the drawings, and more particularly, to FIGS. 1 through 4, 11 generally designates one form of liftoff and landing distance indicator in accordance with the present invention for measuring the actual ground contact roll of an aircraft landing wheel 12. The indicating assembly 11 comprises a transversely extending shaft 13 suitably journalled to the framework of the associated aircraft by means not shown so that the shaft 13 is rotatable on an axis parallel to the axis of rotation of the adjacent landing wheel 12, said shaft 13 being mechanically coupled to the wheel 12 by any suitable coupling means, for example, by a friction roller 14 secured on the shaft 13 and frictionally engaging the inner rim portion 15 of the wheel 12 so as to be driven by said wheel. Shaft 13 is provided with a worm 16 which meshes with a worm gear 17 mounted on another shaft 18 which is journalled by suitable means, not shown, so as to extend transversely with respect to shaft 13. Shaft 18 forms part of a pulsing switch assembly, comprising a stationary contact element 19 and a flexible arm 20 engaged by a cam 21 mounted on the end of shaft 18, the shaft 18 causing cam 21 to close the contacts 20, 19 with each rotation of shaft 18, said contacts being normally open as shown in FIG. 1.

Designated at 22 is a conventional pulse counter, and designated at 23 is a battery having one terminal thereof connected by a wire 24 to the stationary pulsing switch contact element 19 and having its other terminal connected by a wire 25 to one terminal of the pulse counter 22. The remaining terminal of pulse counter 22 is connected by a wire 26 to a pole 27 of a two-position switch 28, the switch having respective stationary contacts 29 and 30 which are selectively engageable by pole 27, the pole 27 being movable into engagement with either of the stationary contacts 29 or 30 by suitable manual means, not shown.

The movable arm 20 of the pulsing switch assembly is connected to a wire 31 which is, in turn, connected to switch contact 30.

Figure 3:
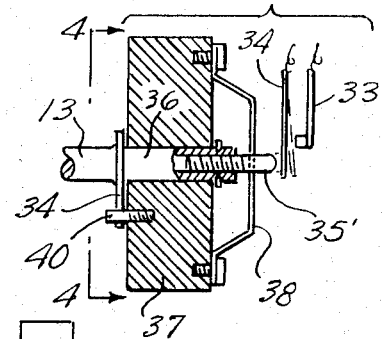
FIG. 3 is a transverse vertical cross-sectional view taken substantially on line 3—3 of FIG. 2.

Designated generally at 32 is a wheel ground contact-responsive switch assembly comprising a stationary contact arm 33 and a movable contact arm 34, the stationary contact arm 33 being connected by a wire 35 to the manually operated switch contact 29 and the movable contact arm 34 being connected to the wire 31. As shown in FIG. 3, the end of the movable contact arm 34 extends adjacent the end of a left hand screw threaded plunger element 35' which is threadedly engaged in a corresponding left hand tapped bore formed in an end portion 36 of shaft 13. Journalled on the shaft portion 36 and being freely rotatable thereon is a flywheel member 37, and diametrically secured on said flywheel member 37 is a resilient wire yoke member 38 which is arched in the manner shown in FIG. 3 and which extends through an aperture provided in the screw threaded plunger member 35', thereby providing a resilient driving connection between flywheel member 37 and plunger member 35'. The normal spacing of the end of plunger member 35' with respect to the arm 34 is such that plunger member 35' moves arm 34 into contact with the associated stationary switch contact member 33 responsive to the rotation of shaft member 13 clockwise through a fraction of a revolution relative to flywheel member 37, as viewed in FIG. 4. Thus, such rotation of shaft 13 relative to flywheel member 37 will cause the plunger member 35' to move rightwardly from the position thereof shown in FIG. 3 to engage arm 34 and move the arm into contact with stationary switch contact member 33 because of the threaded engagement of the plunger member 35' in the end portion 36 of shaft 13. Since the plunger member 35' is axially aligned with shaft portion 36, the movement of plunger member 35' will be in the direction of the axis of shaft 13.

Rigidly secured on shaft 13 is a driving arm 39 which is rotatable into engagement with an abutment pin 40 mounted on flywheel member 37, so that after slightly less than one revolution of shaft 13 relative to flywheel member 37, the arm 39 abuts the pin 40 and forms a positive driving connection wherein the flywheel member 37 rotates with shaft 13 in the same direction therewith. When shaft 13 decelerates, flywheel 37 tends to continue to rotate at its originally driven speed, so that the shaft 13 backs off somewhat with respect to the flywheel member 37, causing the plunger member 35' to be retracted from its switch-closing position because of the threaded connection of the plunger member with the shaft portion 36, thereby causing arm 34 to disengage from stationary contact element 33.

Figure 4:
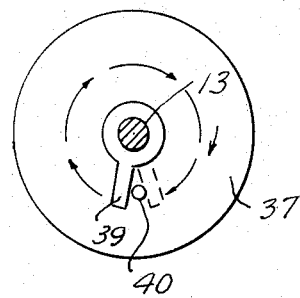
FIG. 4 is a vertical cross-sectional view taken substantially on line 4—4 of FIG. 3.

It will thus be seen that when the aircraft takes off, shaft 13 causes arm 39 to rotate in a clockwise direction relative to flywheel member 37, as viewed in FIG. 4, causing the plunger member 35' to be extended sufficiently to close the switch contacts 34, 33 shortly after the aircraft wheel 12 starts to roll, and as ground contact continues, the arm 39 eventually comes into engagement with the pin member 40, as shown in dotted view in FIG. 4, whereby the flywheel member 37 is positively driven by shaft 13, and the contacts 34, 33 are held closed. When the landing wheel 12 disengages from the ground as the aircraft lifts off, shaft 13 decelerates and rotates counterclockwise relative to flywheel member 37, which tends to maintain its previously established speed of rotation, because of its mass, so that the shaft 13 rotates in a counterclockwise direction, as viewed in FIG. 4, relative to flywheel member 37, and this relative rotation is transmitted through the resilient connection defined by yoke member 38 and the aperture in plunger member 35' in such a manner as to cause the plunger member 35' to be moved leftwardly, as viewed in FIG. 3 to the switch-opening position thereof.

With the pole 27 of the control switch 28 in the position thereof shown in FIG. 1, namely, the "takeoff" position, the initial closure of the wheel roll-responsive switch contacts 34, 33 connects the counter input wire 26 to the wire 31, whereby the rotation of the shaft 13 caused by the rolling of the wheel 12 along the ground causes contacts 19 and 20 to be intermittently closed, thus intermittently connecting the pulse counter 22 to the battery 23. Each pulse thus produced represents a known unit of distance, for example, ten feet, traveled by the aircraft wheel on the ground. When the wheel 12 leaves the ground, the contacts 34, 33 are opened in the manner above-described, terminating the train of pulses, so that the counter 22 reads a quantity representing the actual distance traversed by the wheel 12 on the ground as the aircraft takes off.

When the aircraft lands, the switch pole 27 is moved into engagement with the stationary contact 30, whereby the counter 22 is connected directly to the battery 23 through the intermittently closing contacts 19 and 20, whereby the pulses counted by the counter 22 represent the actual units of distance traveled by the wheel 12 as it makes contact with the ground during the landing of the aircraft.

The counter 12 is provided with the conventional reset means shown at 41 to set it to zero.

It will thus be seen that the pilot can measure the distance traveled on the ground by the landing wheel 12 when the aircraft takes off by placing the pole 27 of switch 28 in the "takeoff" position, shown in full line view in FIG. 1. To measure the landing roll distance, the pilot moves switch pole 27 to its opposite position, namely, engaging the contacts 30, and measures the distance engaged by wheel 12 as the aircraft lands in the manner above-described. By resetting the counter 22 by means of its reset button element 41 after each measurement, the pilot may obtain individual measurements of the takeoff and landing distances, namely, the distances wherein the wheel 12 is in actual rolling contact with the ground.

Figure 5:
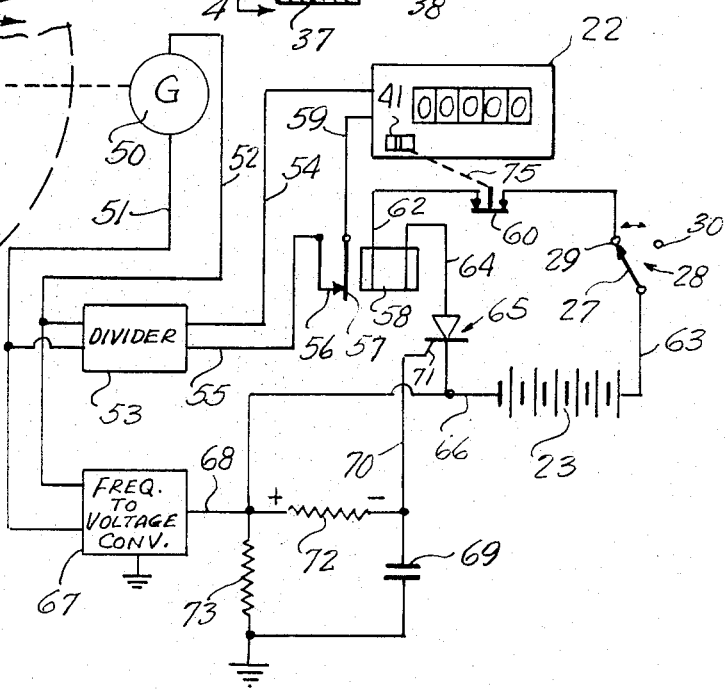
FIG. 5 is a schematic diagram of another form of liftoff and landing distance indicator device for aircraft constructed in accordance with the present invention.

In the embodiment shown in FIG. 5, the shaft 13 is drivingly coupled to a small alternating current generator 50 having the output wires 51 and 52. A conventional frequency divider assembly 53 has its input terminals connected to the wires 51 and 52, the assembly 53 being of a conventional type producing output pulsations having a frequency which is a predetermined fraction of the frequency of the alternations generated by the alternator 50. One output wire 54 of divider 53 is connected to an input terminal of counter 22. The other output wire 55 of the divider is connected through the normally closed contacts 56, 57 of a relay 58 to the remaining input wire 59 of counter 22. One terminal of the winding of the relay 58 is connected through a reset switch 60 to the manually operated selector switch contact 29, the reset switch 60 being suitably coupled to the reset button 41 of the counter 22 so as to open the circuit between the terminal wire 62 and the switch contact 29 whenever the counter 22 is reset to its zero position. The pole 27 of switch 28 is connected by a wire 63 to one terminal of the battery 23. The remaining terminal wire 64 of the relay winding is connected through an electronic switch device, for example, a SCR switch 65 to a wire 66 connected to the remaining terminal of battery 23.

Wires 51 and 52 are connected to the input terminals of a conventional frequency counter device 67, namely, a device which converts the alternating current from generator 50 to an output DC voltage whose magnitude is in accordance with the frequency of the alternating current generated by the alternator 50. This positive output voltage appears at the output terminal wire 68, which is connected to battery wire 66. The negative terminal of the output circuit of device 67 is grounded and connected between wire 68 and ground is a deceleration-responsive circuit comprising a capacitor 69 having one terminal grounded and having its other terminal connected by a wire 70 to the gating electrode 71 of the electronic switch device 65. A suitable resistor 72 is connected between the wire 70 and the wire 68, and a terminating resistor 73 is connected between the wire 68 and ground.

With switch pole 27 engaging stationary contacts 29, as shown in FIG. 5, when wheel 12 starts to roll upon takeoff, the alternator 50 causes the divider 53 to provide pulses which are furnished through the counter 22 through the normally closed contacts 56, 57, whereby the device 22 begins counting. The output of the DC voltage conversion device 67 charges the condenser 69 through the resistor 72 to a voltage wherein the wire 70 is negative with respect to the wire 66. As the wheel lifts off and the frequency of the alternating current furnished to device 67 decreases, the capacitor 69 must discharge through the resistor 72, which in so doing provides gate current at the gate electrode 71 to fire the SCR 65 and thereby energize the relay 58, opening the contacts 56, 57 and stopping the count. The takeoff distance may then be read on the counter 22. Relay 58 may be deenergized concurrently with the resetting of the counter by the provision of a suitable coupling 75 provided between the reset switch 60 and the reset button 41, whereby the reset switch 60 opens simultaneously with the actuation of the reset button 41. This restores the normal configuration, namely, allows contacts 56, 57 to close.

For determining landing distance, the switch pole 27 is moved into engagement with the open switch contact 30, whereby the counter 22 receives pulses from the divider unit 53 representing the actual contact rolling distance of the wheel 12 with the ground, the relay contacts 56, 57 remaining closed during the landing of the aircraft.

While certain specific embodiments of an improved liftoff and landing distance indicator for aircraft have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an aircraft having landing wheels, a liftoff and landing distance indicator comprising an electrical circuit including a source of current, pulse-forming means, a pulse counting device and deceleration-sensing switch means, means drivingly coupling a wheel of the aircraft to said pulse-forming means, means to maintain closure of said switch means during rolling ground engagement of the wheel, and means to open said switch means responsive to deceleration of the wheel when it leaves the ground during takeoff of the aircraft.

2. The liftoff and landing distance indicator of claim 1, and manually controlled means to at times render the deceleration-responsive means inactive, whereby said switch means may be maintained closed during landing of the aircraft.

3. The liftoff and landing distance indicator of claim 1, and wherein said pulse-forming means comprises a pair of contacts and means to intermittently close said contacts responsive to rotation of said wheel.

4. The liftoff and landing distance indicator of claim 3, and wherein the coupling means includes a shaft drivingly connected to the wheel, and wherein the deceleration-sensing switch means comprises a flywheel rotatably mounted on the shaft, means to limit rotation of the flywheel relative to the shaft, a pair of contacts, and means to close the contacts responsive to rotation of the shaft in one direction relative to the fywheel.

5. The liftoff and landing distance indicator of claim 4, and wherein said rotation limiting means comprises a projection on the flywheel and an arm on the shaft engagable with said projection.

6. The liftoff and landing distance indicator of claim 5, and wherein the contact-closing means comprises a plunger member axially threadedly engaged with the shaft and being operatively engageable with one of the contacts to move it toward the other contact responsive to rotation of the shaft relative to the plunger member, and means connecting the plunger member to the flywheel.

7. The liftoff and landing distance indicator of claim 6, and wherein the connecting means comprises a resilient member extending through the plunger member and secured to the flywheel.

8. The liftoff and landing distance indicator of claim 4, and a manually operated sensing switch connected across said pair of contacts for at times rendering the deceleration-sensing switch means inoperative.

9. The liftoff and landing distance indicator of claim 1, and wherein said source of current and pulse-forming means comprises an alternator drivingly coupled to the wheel and a frequency divider connected to the output of the alternator.

10. The liftoff and landing distance indicator of claim 9, and wherein the deceleration-responsive means comprises relay means to operate said switch means, chargeable capacitor means connected to the output of the alternator, discharge circuit means connected to said chargeable capacitor means, energizing circuit means connected to said relay means and including an electronic switch device, and means to render said electronic switch device conductive responsive to discharge of said capacitor means through said discharge circuit means, said discharge occurring when the wheel decelerates upon leaving the ground during takeoff of the aircraft.

* * * * *